(12) United States Patent
Lauper et al.

(10) Patent No.: US 6,726,100 B2
(45) Date of Patent: Apr. 27, 2004

(54) METHOD FOR SPREADING PARAMETERS IN OFFLINE CHIP-CARD TERMINALS AS WELL AS CORRESPONDING CHIP-CARD TERMINALS AND USER CHIP-CARDS

(75) Inventors: Eric Lauper, Bern (CH); Renato Cantini, Belfaux (CH)

(73) Assignee: Swisscom Mobile AG, Bern (CH)

( * ) Notice: Subject to any disclaimer, the term of this patent is extended or adjusted under 35 U.S.C. 154(b) by 51 days.

(21) Appl. No.: 10/238,541

(22) Filed: Sep. 10, 2002

(65) Prior Publication Data

US 2003/0034389 A1 Feb. 20, 2003

Related U.S. Application Data

(63) Continuation of application No. PCT/CH00/00149, filed on Mar. 15, 2000.

(51) Int. Cl.[7] .................................................. G06K 5/00
(52) U.S. Cl. ........................................ 235/380; 235/492
(58) Field of Search ........................... 235/380, 381, 235/382, 375, 379, 492, 383; 705/41, 42, 43, 44

(56) References Cited

U.S. PATENT DOCUMENTS

| | | | | |
|---|---|---|---|---|
| 4,007,355 A | * | 2/1977 | Moreno | 235/379 |
| 4,839,640 A | * | 6/1989 | Ozer et al. | 340/5.33 |
| 5,067,155 A | * | 11/1991 | Bianco et al. | 713/185 |
| 5,276,312 A | | 1/1994 | McCarthy | |
| 5,313,393 A | * | 5/1994 | Varley et al. | 705/28 |
| 6,398,115 B2 | * | 6/2002 | Krause | 235/492 |
| 2002/0013898 A1 | * | 1/2002 | Sudia et al. | 713/155 |
| 2003/0034389 A1 | * | 2/2003 | Cantini et al. | 235/380 |

FOREIGN PATENT DOCUMENTS

| | | |
|---|---|---|
| EP | 0 360 613 | 3/1990 |
| GB | 2 208 955 A | 4/1989 |
| WO | WO 97 36265 | 10/1997 |
| WO | WO 00 21044 | 4/2000 |

* cited by examiner

*Primary Examiner*—Thien M. Le
(74) *Attorney, Agent, or Firm*—Pearne & Gordon LLP

(57) ABSTRACT

Method for updating time-limited parameters (50), in particular lists of blocked user chip-cards, in offline chip-card terminals (5), in which said parameters are updated with the user chip-cards (4) used in said offline chip-card terminal (5).

Advantage: the offline terminals do not have to be inspected manually.

21 Claims, 1 Drawing Sheet

METHOD FOR SPREADING PARAMETERS IN OFFLINE CHIP-CARD TERMINALS AS WELL AS CORRESPONDING CHIP-CARD TERMINALS AND USER CHIP-CARDS

This application is a Continuation of PCT/CH00/00149, filed Mar. 15, 2000.

FIELD OF THE INVENTION

The present invention concerns a method for spreading parameters in offline chip-card terminals as well as corresponding chip-card terminals and user chip-cards.

RELATED ART

Chip-card terminals are used more and more often as identification means for different systems and as portable data storage means with data processing abilities. Among others, it is known that chip-cards can be used as electronic money wallet enabling payment at different points of sale. Conceivable applications for chip-cards as electronic money wallets comprise, among others, food retail stores, department stores, utilization of parking space, public transportation means, personal transportation means (taxis), service stations, hotels and restaurants, canteens and refectories, automatic vending machines for drinks and food, road tolls, sale of admission tickets, access control devices, public telecommunication services, internet, online services, pay-TV, etc. Furthermore, it is also known that chip-cards can be used purely as user identification means, for example in mobile radio telephones (SIM cards) or as admission tickets.

These different implementation sites use chip-card terminals that power the user chip-cards and can establish a data technological connection with the card, for example in order to read the identification in the card or to transfer electronic money. Such terminals can either be connected to existing systems (for example check-out systems) or be used as 'stand alone' apparatus.

In order to verify the users' identity, the user is often required to enter a secret, for example a PIN or biometric parameters. In order to verify this, terminals are often connected online with a center, for example over a private or public telecommunication network. This online connection is also used to transfer electronic money units and to update time-limited terminal parameters (i.e. valid for at least a certain period of time), for example to spread as fast as possible lists of blocked cards in the terminals.

However, such a permanent connection between terminal and center is costly. If the user chip-card is also to be used for paying small amounts, for example at a kiosk, for bus tickets, etc., the price for the connection can in certain cases constitute a substantial part of the transaction value. Furthermore, the connection of a terminal with a telecommunication network is often technically impracticable or attainable only with much effort, for example if the terminal must be installed far from any available telephone point of connection.

In order to avoid these connection costs, so-called offline terminals have also been developed that work self-sufficiently without being connected with a superordinate center. Typical offline chip-card terminals are for example used in businesses when the average amounts paid is approximately on the same order as the connection costs.

Furthermore, so-called hybrid terminals are also known that are connected with a telecommunication network only intermittently (on and off), for example once a day, to send all the day's transactions to the center in one go.

One problem with offline and hybrid terminals is the updating of time-limited parameters. Each terminal usually uses a series of parameters that are not durable and not linked to a specific transaction, and that occasionally have to be updated (for example several times a week). Such parameters comprise, among others, lists of blocked user chip-cards (for example chip-cards that are not valid, no longer valid or fraudulently used) as well as scales of transaction charges.

In the case of chip-card terminals that are also used for money transactions with money cards, these parameters also comprise the lists of performed transactions that have to be transmitted to the center, as well as the content of the electronic money accounts that is to be transferred.

Such parameters are usually updated manually, in that an employee checks all terminals and copies the time-limited parameters from or into a portable device that is then connected with the center. In the case of a portable chip-card terminal, the latter can also be brought itself to a point of connection of the center, as described in WO9517738. This manual updating operation is however tedious, in particular because many widely spread terminals must be inspected.

Furthermore, the chip-card terminals must comprise input means (for example a keyboard, an interface to the updating device, possibly a display) that are operated by the employee in order to update the parameters. Such input means increase the cost of the terminal and require a larger housing.

It is an aim of the invention to propose a new method with which said parameters can be updated with less effort.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved by a method in which time-limited parameters are updated in offline chip-card terminals with the user chip-cards used in the chip-card terminals.

In particular, the time-limited parameters, for example lists of blocked user chip-cards, scales of charges, etc. are copied in user chip-cards, preferably ciphered and/or in a secure memory area of the user chip-card inaccessible to the chip-card's user, and are spread through these user chip-cards from terminal to terminal.

This method is adapted in particular to systems in which the same user chip-cards are used both in offline as well as in online chip-card terminals. This is in particular the case of hybrid systems in which not all terminals are connected online, but also to systems that are used for different applications, for example for SIM cards, which can also be used as value cards for offline terminals.

An advantage of the present invention is that each user chip-card contains in particular parameters relating to other user chip-cards, for example lists of other blocked user chip-cards. The card owner is not in a position to modify the parameters and will anyway have no reasons to attempt to falsify the card and modify the parameters of other cards.

Another advantage is that no additional chip-cards are necessary in order to update said time-limited parameters in offline terminals. Only the user chip-cards, which are also used for transactions with online and/or offline terminals, are needed. The operation is totally transparent for the user and he is not required to carry out other steps or actions than for normal transactions with the terminals.

DESCRIPTION OF THE DRAWINGS

Hereafter, preferred embodiments of the invention will be described in more detail with the aid of the attached figure, in which.

DETAILED DESCRIPTION OF THE INVENTION

Figure 1:
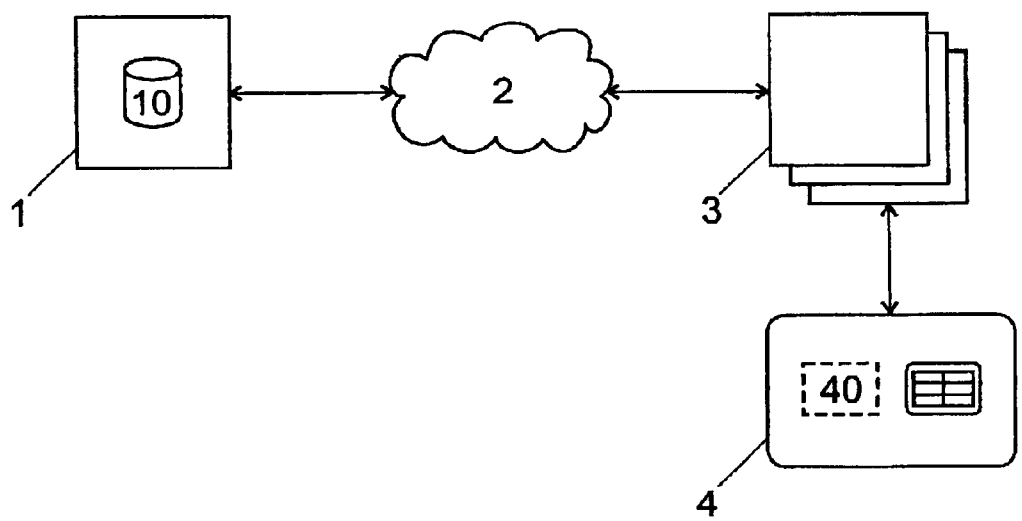
FIG. 1 shows diagrammatically a system with a center, a plurality of online chip-card terminals and a user chip-card according to the invention.

FIG. 1 shows a system with a center 1, in which parameters for a plurality of chip-card terminals are stored in a memory area 10. The center 1 can for example consist of one or several computers, for example of a server of a finance institute or of a service provider. The parameters in the memory area 10 can for example comprise lists of blocked user chip-cards, scales of charges, the balance of electronic bank accounts, lists of performed transactions, user profiles, cryptographic keys or certificates, etc.

A plurality of online terminals 3 is connected over a telecommunication system 2 with the center and possibly also among each other. The telecommunication network 2 can for example consist of a public network (for example an ISDN or mobile radio network), of the Internet, or of private connections, for example of a private network, for example a LAN (Local Area Network) or WAN (Wide Area Network). According to the application, it is possible to use either portable terminals 3 that are powered with batteries or solar cells, or stationary terminals that are powered from the electricity network or data lines. It is possible to use for example portable mobile radio devices 3, for example mobile radio telephones according to GSM (Global System for Mobile Communication) or according to UMTS (Universal Mobile Telecommunication System), or portable terminals with a connection for a mobile radio part, for example in the form of a PC card. As stationary terminals, it is possible to use for example chip-card terminals for banknote dispensing machines or for check-out cashiers' tills. The system can also comprise hybrid terminals that are not continuously connected with the center 1, but establish a connection only intermittently (for example periodically or as required).

The chip-card terminals 3 comprise a card reader and a terminal computer. The card reader into which the user chip-card is inserted and which is then electrically contacted has mainly a mechanical function. A computer is used to control the card reader, to manage the user interface and establish the connection to the center 1 and to other devices (for example to a check-out cashiers' till).

The present invention can however also be used with contactless user chip-cards or with other RFID (Radio Frequency Identification) elements, for example in watches, transponders, in mobile telephones equipped with a radio interface, in palmtops, etc. Similarly, the present invention can be used with components and devices containing a user identification and capable of connecting over a Bluetooth interface with external terminals, for example in order to perform transactions.

User chip-cards 4 can be inserted in the chip-card terminals 3 to perform transactions. According to the application and system, the chip-card 4 can for example consist of a value card in which electronic money units are stored, of a telephone card, for example a SIM (Subscriber Identification Module) or WIM (WAP Identification Module) card or of a telephone card for public telephone cells, of an admission card for secured systems or buildings, etc. User chip-cards are usually distributed to all authorized users of the terminals; at least certain transactions with the chip-card terminal can only be performed with a valid user chip-card.

In the case of a value card 4, the following transactions for example can be performed with the terminal 3:

Loading the user chip-card with electronic money units,

Charging the electronic money account in the value card 4 or in the center 1, Verifying the money account in the value cad 4 or in the center 1, Modifying the access PINs or the secret, Verifying the identification in the card 4 in order to allow access to systems or services, Performing cryptographic operations through the chip-card 4 (e.g. digital signature), etc.

Performing transactions depends on several time-limited parameters in terminal 3, i.e. parameters that have to be updated only occasionally, for example daily, weekly, monthly or as required. According to the type of terminal, the following time-limited parameters for example can be provided:

List of blocked user chip-cards: this list contains the number or identification of cards that are no longer valid, for example because the validity date has expired, because they have been stolen or misused, etc.

Scales of charges, in particular for automatic vending machines in which the user chip-card is used as currency, Cryptographic elements, for example electronic keys and/ or certificates, user passwords, etc.

Credit worthiness of chip-card users with their financial institute,

New software components for the terminal, for example as applet or CORBA components, Parameter tables for the software applications performed in the terminal 3, List of the transactions performed with the terminal 3, etc.

According to the system, at least certain of these parameters can also be stored in the memory area 10 in the center 1, as already mentioned.

According to the invention, at least certain of these parameters are copied in at least certain of the user chip-cards 4 connected with the terminal 3 and otherwise meant by the users for performing normal transactions with the terminals 3, 5. Preferably, these parameters are stored in a secured memory area 40, for example in the EEPROM, that is not accessible by the user of the chip-card 4. Preferably, at least certain parameters are encrypted so that only authorized chip-card readers can access these parameters.

The copied parameters are preferably provided with a date, for example with the date of the transmission in the chip-card 4 or with the creation date of the new parameters. If the parameters are copied in a data file, it is either possible to provide with a single date either the data file or each individual parameter. If a parameter-set is already located in the user chip-card 4, it is possible to copy with a synchronizing program only those parameters that need to be updated. The date can either be set by the terminal 3 or by an appropriate module in the user chip-card 4. Preferably, an electronic dating stamp is used, with which the authenticity of the date can be verified. Furthermore, at least certain parameters can be provided with a validity date and/or with a validity duration.

It is also possible to use time elements with an incremental clock that renders superfluous the use of more sophisticated real-time clock elements.

Figure 2:
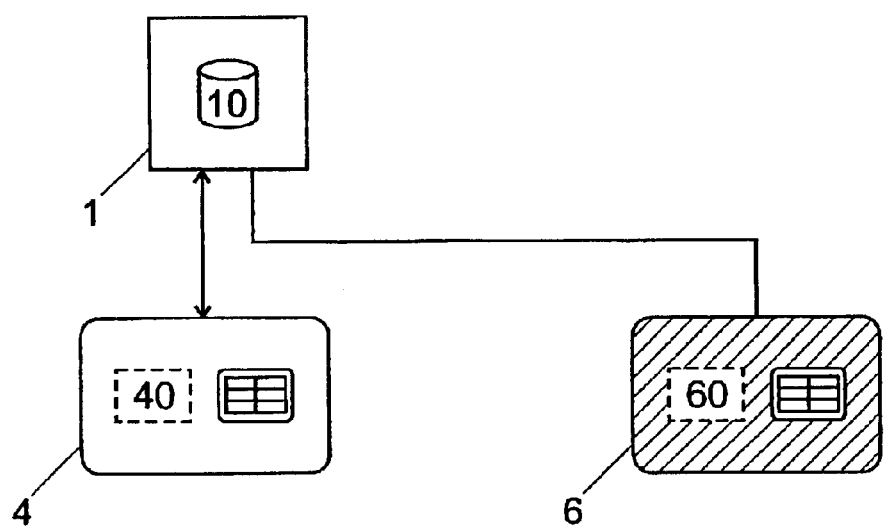
FIG. 2 shows diagrammatically a system with an offline chip-card terminal, a user chip-card according to the invention and a blocked user chip-card.

FIG. 2 shows a system with an offline chip-card terminal 5, with which the user chip-card 4 is connected at every transaction. In the terminal 5, time-limited parameters (for example the aforementioned parameters) are stored in a memory area 50. According to the invention, these parameters are updated each time the chip-card 4 of a user is inserted for a transaction in the terminal 5, in that the terminal accesses the parameters stored in the aforementioned memory area 40 and compares these parameters with its own. If parameters are stored in the memory area 40 that are newer than the parameters 50 in the terminal 5, or that are not available in the terminal 5, an appropriate module in the terminal copies the new parameters in the memory area 50, a synchronizing module being provided in order to copy only the newest parameters.

The present invention is particularly adapted to spread lists of blocked user chip-cards 6 in offline terminals. If the center 1 decides to block a chip-card, it can copy the identification of this card over the telecommunication system 2 into all online terminals 3, or at least into all the online terminals of the geographical area in which the chip-card to be blocked is used. The card 6 is thus blocked for use with the online terminals 3. If another, valid user chip-card 4 is inserted in an online terminal 3, the terminal 3 copies the identification of the blocked card in the secured memory area 40.

As soon as the user chip-card 4 is connected with an offline terminal 5, an appropriate module in the terminal or possibly in the user chip-card 4 verifies whether the list of blocked cards 50 stored in the terminal needs to be updated. If this is the case, i.e. if the identification of the blocked card 6 is not contained in the list 50, the identification of this blocked card 6 is copied into the terminal. Thus, the card 6 is blocked for use with this terminal 5.

The one skilled in the art will understand that also the blocked card 6 can contain a memory area 60 for terminal parameters and can thus also be used to spread these parameters if the user attempts to use it in different terminals.

The one skilled in the art will furthermore understand that the secured memory area 40 can also be written by the offline terminals. In this manner, offline terminals 5 can also spread for example lists of blocked chip-cards 6.

This method can also be used to transmit parameters and data files 50 from offline terminals over user chip-cards 4 and online terminals 3 to the center. It is possible in this way to transmit for example lists of the cards blocked by the offline terminal, lists of the transactions performed by the terminal 5, or electronic money units from the offline terminals to the center 1. In this manner, the balance of the electronic units in the terminals 5 can be settled and money units transmitted into the center 1 without the user of the transmission card 4 being able to access these units.

Systems are known that comprise thousands of chip-card terminals 3, 5 and millions of user chip-cards 4. In such systems, the list of the blocked cards can be too large to be stored in the limited memory area of a user chip-card.

In order to avoid this problem, in a preferred embodiment of the invention, the identifications of only the chip-cards 6 to be blocked and that are used in the same limited geographical area are stored in a user chip-card 4 (geographical limitation of the list). Preferably, the identifications of only the recently blocked cards (e.g. during the last year) are furthermore copied. In this manner, only geographically and temporally relevant information is copied in the user chip-cards.

In a preferred embodiment of the invention, different security requirements are defined for used services and/or terminals. In this case, at least certain parameters are only copied in terminals and/or only used for blocking services demanding higher security requirements. For example, lists of blocked cards are copied in user chip-cards only if these cards are used for high-security services or in high-security offline terminals. It is also possible to define different types of terminals and applications that can be accessed with the same multifunctional user chip-cards but that can however be blocked or updated independently from each other. For this purpose, said parameters that are copied in the user chip-cards can be linked with terminal indications and/or application indications.

In this manner, only the parameters that are security-relevant are copied in the user chip-cards.

What is claimed is:

1. A method for updating time-limited parameters in offline chip-card terminals, said time-limited parameters being updated with the user chip-cards used in said offline chip-card terminals, when these are used for transactions with said offline chip-card terminals, said time-limited parameters comprising identifications of blocked user chip-cards, wherein at least certain of said time-limited parameters are stored in the user chip-cards in such a way that only authorized chip-card readers can access these parameters but not the user of the chip-card.

2. The method of claim 1, at least certain of said time-limited parameters being stored in a memory area of the user chip-card that cannot be accessed by the user.

3. The method of claim 1, at least certain of said time-limited parameters being encrypted.

4. The method of claim 1, said identifications of blocked user chip-cards being copied only in the user chip-cards that are used in the same geographical area.

5. The method of claim 4, said time-limited parameters being copied in said user chip-cards when these are connected for a transaction with online chip-card terminals.

6. The method of claim 1, at least certain of said time-limited parameters being copied in said user chip-cards when these are connected with offline chip-card terminals.

7. The method of claim 1, said time-limited parameters comprising the scales of charges of said offline chip-card terminals.

8. The method of claim 1, said time-limited parameters being linked with a time indication.

9. The method of claim 8, said time-limited parameters being linked with a dating stamp.

10. The method of claim 1, lists of parameters of performed transactions being copied from said offline chip-card terminals in said user chip-cards.

11. The method of claim 1, said time-limited parameters comprising electronic money units that are transmitted in this way between offline chip-card terminals and online chip-card terminals without the user of said user chip-card being able to use them.

12. The method of claim 1, other time-limited parameters being copied over said user chip-cards from said offline terminals into said online terminals.

13. The method of claim 12, said other time-limited parameters comprising electronic money units.

14. A user chip-card that can be connected with offline chip-card terminals for performing transactions and comprising parameters that are meant for updating time-limited parameters in said chip-card terminals, wherein at least certain of said time-limited parameters are stored in the user chip-cards in such a way that only authorized chip-card readers can access these parameters but not the users of the chip-cards.

15. The user chip-card of claim 14, at least certain of said parameters being encrypted.

16. The user chip-card of claim 14, at least certain of said parameters being stored in a memory area of the user chip-card that the user cannot access.

17. The user chip-card of claim 14, said parameters comprising lists of transactions performed with other user chip-cards.

18. The user chip-card of claim 14, said parameters comprising lists of blocked user chip-cards that are used in the same geographical area.

19. The user chip-card of claim 14, said parameters comprising scales of charges.

20. An offline chip-card terminal comprising data processing means in order to determine the types of chip-cards that have to be blocked and in order to store the identification of these user chip-cards in such a way that only authorized chip-card readers can access these parameters but not the user of the chip-card.

21. The offline chip-card terminal of claim 20, said identifications being copied only in user chip-cards that are used in the same geographical area.

* * * * *